(12) United States Patent
Muller

(10) Patent No.: US 6,751,300 B2
(45) Date of Patent: Jun. 15, 2004

(54) NETWORK BASED VOICE MAIL WITH CALL SCREENING

(75) Inventor: Urs A. Muller, Keyport, NJ (US)

(73) Assignee: AT&T Corp., New York, NY (US)

( * ) Notice: Subject to any disclaimer, the term of this patent is extended or adjusted under 35 U.S.C. 154(b) by 178 days.

(21) Appl. No.: 09/898,023

(22) Filed: Jul. 5, 2001

(65) Prior Publication Data

US 2001/0053206 A1 Dec. 20, 2001

Related U.S. Application Data

(63) Continuation of application No. 09/040,668, filed on Mar. 18, 1998, now Pat. No. 6,295,341.

(51) Int. Cl.[7] ............................................... H04M 1/64
(52) U.S. Cl. .......................... 379/88.18; 379/88.12; 379/82.15; 379/88.17; 379/207.01
(58) Field of Search .......................... 379/70, 71, 88.01, 379/88.11–88.15, 88.17, 88.18, 88.22–88.25, 88.28, 201.01, 201.06, 201.07, 202.01, 204.01, 205.01, 206.01, 207.01, 207.02, 207.04, 207.11, 211.01, 212.01, 90.01, 93.01, 93.05, 93.07

(56) References Cited

U.S. PATENT DOCUMENTS

| | | | | |
|---|---|---|---|---|
| 4,646,346 A | * | 2/1987 | Emerson et al. | 379/214.01 |
| 4,935,954 A | * | 6/1990 | Thompson et al. | 379/88.04 |
| 5,172,404 A | * | 12/1992 | Hashimoto | 379/88.18 |
| 5,243,642 A | * | 9/1993 | Wise et al. | 379/82 |
| 5,307,399 A | * | 4/1994 | Dai et al. | 455/459 |
| 5,471,519 A | | 11/1995 | Howe et al. | |
| 5,548,636 A | | 8/1996 | Bannister et al. | |
| 5,557,659 A | | 9/1996 | Hyde-Thomson | |
| 5,638,424 A | | 6/1997 | Denio et al. | |
| 5,647,002 A | * | 7/1997 | Brunson | 709/206 |
| 5,651,054 A | | 7/1997 | Dunn et al. | |
| 5,675,507 A | | 10/1997 | Bobo, II | |
| 5,706,211 A | * | 1/1998 | Beletic et al. | 709/206 |
| 5,712,902 A | | 1/1998 | Florence et al. | |
| 5,822,405 A | | 10/1998 | Astarabadi | |
| 5,822,692 A | * | 10/1998 | Krishan et al. | 455/419 |
| 5,857,013 A | * | 1/1999 | Yue et al. | 379/88.2 |
| 5,930,338 A | * | 7/1999 | McKendry et al. | 379/88.25 |
| 5,956,389 A | | 9/1999 | Jung | |
| 5,991,366 A | * | 11/1999 | Henrick et al. | 379/88.18 |
| 6,006,087 A | * | 12/1999 | Amin | 455/413 |
| 6,181,781 B1 | * | 1/2001 | Porter et al. | 379/88.17 |
| 6,295,341 B1 | * | 9/2001 | Muller | 379/88.18 |

* cited by examiner

Primary Examiner—Roland Foster

(57) ABSTRACT

Embodiments of the present invention provide a network based voice mail system that includes advantages of traditional answering machines. When a call comes in that is not answered, a Remote Answering Device may pick up after a preselected number of rings and play a prerecorded greeting that is stored locally and then prompt the caller to wait for the beep. The Remote Answering Device may use three-way calling service to conference the user's voice mail number into the call. When a conference call is established it plays the beep and then plays the message which is being recording live on the speaker. If a call is received by the network based voice mail system that did net first pass through the Remote Answering Device, the network based voice mail system may synchronize the Remote Answering Device with the network based voice mail system.

16 Claims, 3 Drawing Sheets

NETWORK BASED VOICE MAIL WITH CALL SCREENING

This is a continuation of application Ser. No. 09/040,668 filed Mar. 18, 1998, now U.S. Pat. No. 6,295,341 B1.

BACKGROUND OF THE INVENTION

The present invention relates generally to voice mail systems, and more particularly to network based voice mail systems.

Network based voice mail systems offer a number of interesting advantages compared to traditional answering machine devices, for example, better voice quality, better reliability, the possibility of leaving messages without disturbing recipients by ringing their phone, notification (e.g., pager) or alternative message retrieval (e.g., from a personal computer).

Network based voice mail is furthermore a prerequisite for unified messaging, which requires a single point access to voice mail, electronic mail (e-mail) and fax. These advantages are not only interesting for customers but also for service providers who can sell more and provide better services.

Despite these advantages and despite several attempts from the local telephone companies, network based voice mail to date has not had much success with home customers, even if the service was offered free of charge! According to one survey, the primary reason for this, is the inability to screen calls before answering them. Caller ID devices do not compensate for the loss in case of home usage for several reasons. For one, caller ID devices only show who is calling but give no indication of the purpose of the call. Knowing what the caller wants is important to decide whether or not to answer the call. Moreover, caller ID information is not always available and the caller ID display cannot be read from a distance. To view the display, one would have to walk up to the phone—an activity which is bothersome and which may interrupt one's dinner or other leisure activity.

Other reasons for not using network based voice mail are the lack of a message indicator and the increased complexity for retrieving voice mail from a network (e.g., no simple "play" button).

One attempt to solve this problem is a product known as Solo-Point, which can be found on the World Wide Web. This device uses three-way calling to conference in a network based voice mail system with a local device that plays the incoming message to enable a user to screen calls. This enables a user to screen calls with a network based voice mail system. Unfortunately, this product is unable to stay in synchronization with the network based voice mail system, in that it cannot always correctly indicate the number of telephone messages in the network based voice mail system because calls that do not pass through this product are not logged by it. This can occur if the telephone line is busy, or the network based voice mail system is accessed directly by a caller. As a result, messages could exist in the network based voice mail system, while the Solo-Point device indicates there are no messages waiting to be played.

The present invention is therefore directed to the problem of developing a network based voice mail system that enables the user to screen calls, yet accurately indicates the number of messages in the network based telephone system and is as easy to use as conventional telephone answering machines.

SUMMARY OF THE INVENTION

The present invention solves this problem by providing a remote answering device that is coupled to the network based voice mail system through the telephone network using three-way calling, which remote answering device includes a speaker that enables the user to screen calls and a series of keys to access the network based voice mail system, and a paging device disposed in the network based voice mail system that contacts the remote answering device when the network based voice mail system receives a message that it identifies as not having passed through the remote answering device.

According to the present invention a network based voice mail apparatus includes a network based voice mail system with a user voice mail box, at least one remote answering device coupled to a user's incoming telephone line, and a telephone network providing three-way calling service, wherein the remote answering device answers an incoming call after a predetermined number of rings, and conferences in the user's voice mail box in the network based voice mail system using the three-way calling service of the telephone network. In addition, the apparatus includes a paging device that determines that a call was received by the network based voice mail system without simultaneously passing through the remote answering device, which pages the remote answering device and updates the message counter.

Furthermore, the present invention also includes a remote answering device, for use in a network based voice mail system wherein a user voice mail box is accessible over a telephone network via a predetermined telephone number and an optional predetermined access code. This device includes a modem (as used herein, modem refers to any telephone/network interface device, either analog or digital) capable of answering an incoming call upon detecting a predetermined number of rings, dialing the user's voice mail box using a three-way calling service and conferencing the incoming call with the user's voice mail box, a memory for storing the predetermined telephone number and the optional predetermined access code, and a processor for controlling the modem and passing the predetermined telephone number and optional predetermined access code from the memory to the modem. In addition, the device includes a paging receiver that receives a page from the network based voice mail system when a message enters the network based voice mail system without previously having passed through the device. The processor then updates the message counter based on the page received by the paging receiver.

According to the present invention, a method for enabling screening of calls by a network based voice mail system, includes the steps of a) monitoring an incoming call to determine whether the call is not being answered by a user; b) answering the incoming call if the user does not answer; c) playing a greeting for the caller; d) conferencing in the user's network based voice mail system; e) recording a message using the network based voice mail system while simultaneously playing the message over a speaker disposed in the user's location; and f) paging a remote answering device if a call is received by the user's network based voice mail system without simultaneously passing through the remote answering device.

In this method according to the present invention, one particularly useful embodiment includes the steps of: f) sensing with the remote answering device when a call is not answered and right after the incoming call has been forwarded to the voice mail system placing a call to the voice mail system itself; and g) conferencing the call from the remote answering device with the incoming call forwarded to the network based voice mail system.

DETAILED DESCRIPTION

The present invention presents a solution for providing network based voice mail without the loss of any of the advantages of traditional answering machines. It does require the installation of a small device at the telephone site, which looks like an answering machine and costs about the same. In addition, the present invention uses three-way calling service, which is currently available in most places. There is, however, no requirement for changing or reprogramming the local switch, which can be a significant expense, other than providing a paging device at the network based voice mail system. Any service provider can offer the voice mail service without requiring intervention of the local telephone service provider.

Figure 1:
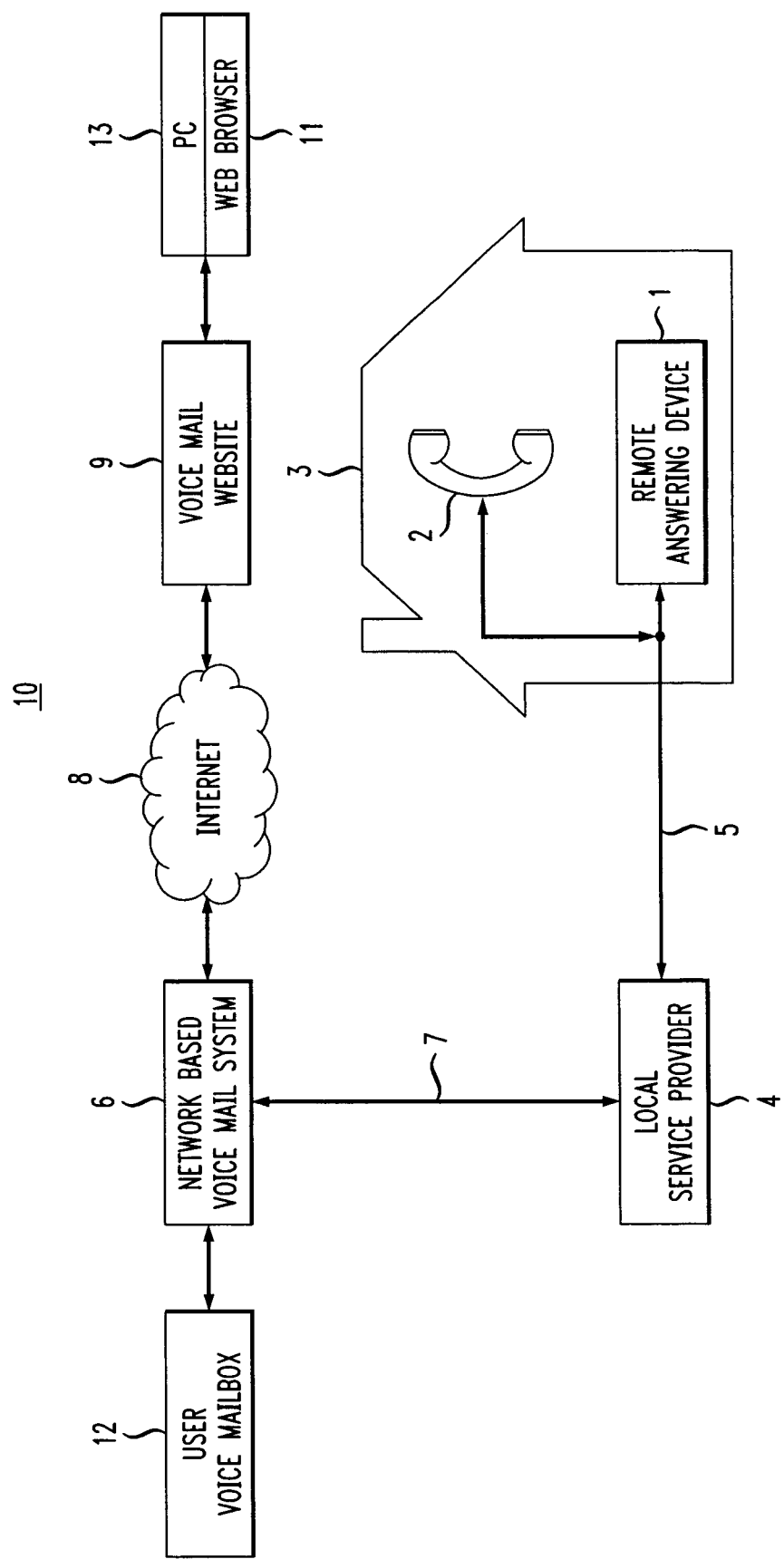
FIG. 1 depicts a block diagram of the present invention.

FIG. 1 depicts the system 10 of the present invention. A Remote Answering Device 1 is connected in parallel with the telephone(s) 2 inside one's home 3 to the Local Service Provider 4 via the local telephone line 5. The Local Service Provider 4 connects the Remote Answering Device 1 to a Network Based Voice Mail System 6 via the telephone network 7. The Network Based Voice Mail System 6 is also connected to the Internet 8, which has a Web Site 9 via which the user can access using a Web Browser 11 running on the user's Personal Computer 13 to review the messages in the user's Voice Mail Box 12 in the Network Based Voice Mail System 6. Each of these elements and interfaces will now be described in more detail.

Remote Answering Device

Figure 2:
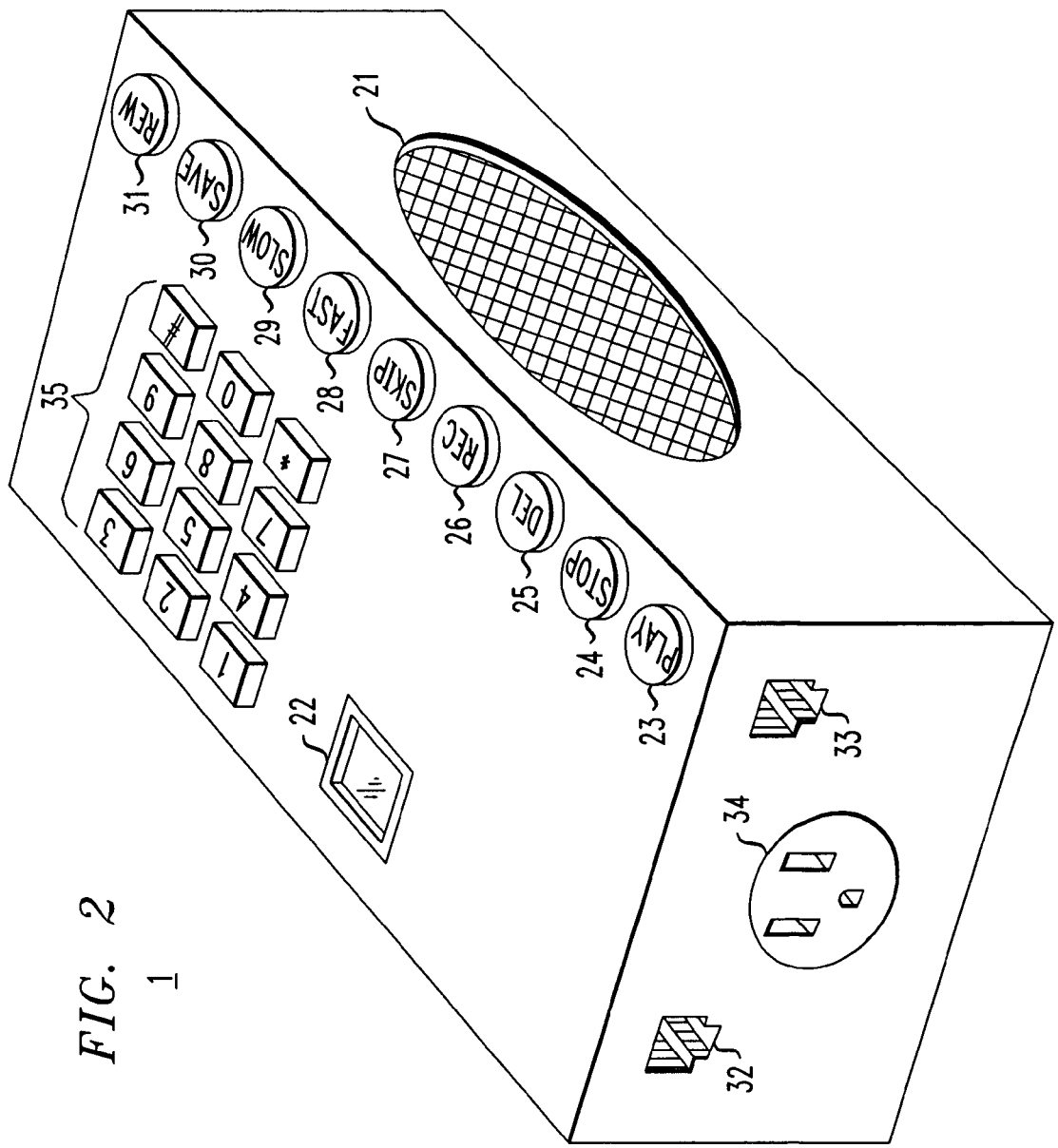
FIG. 2 depicts one embodiment of the exterior of the Remote Answering Device according to the present invention.

Turning to FIG. 2, shown is the Remote Answering Device 1, which looks just like an ordinary answering machine. It has a speaker 21, a message number indicator 22 and basic play back control buttons, such as "play" 23, "stop" 24, "delete" 25, "record" 26, "skip" 27, "fast" 28, "slow" 29, "save" 30, "rewind" 31, etc. The Remote Answering Device 1 may or may not have a normal telephone built in. The Remote Answering Device 1 plugs into a normal telephone jack 32, and may include a second RJ-11 jack 33 and is powered by a normal 120 V electrical outlet 34. In addition, the Remote Answering Device 1 includes a number keypad 35 for entering in the telephone number of the user's voice mail system, and for entering in security codes for accessing the network based voice mail system 6, if desired. For the customer, there is no visible difference from a normal answering machine. Throughout this document the device will be called the "Remote Answering Device."

Figure 3:
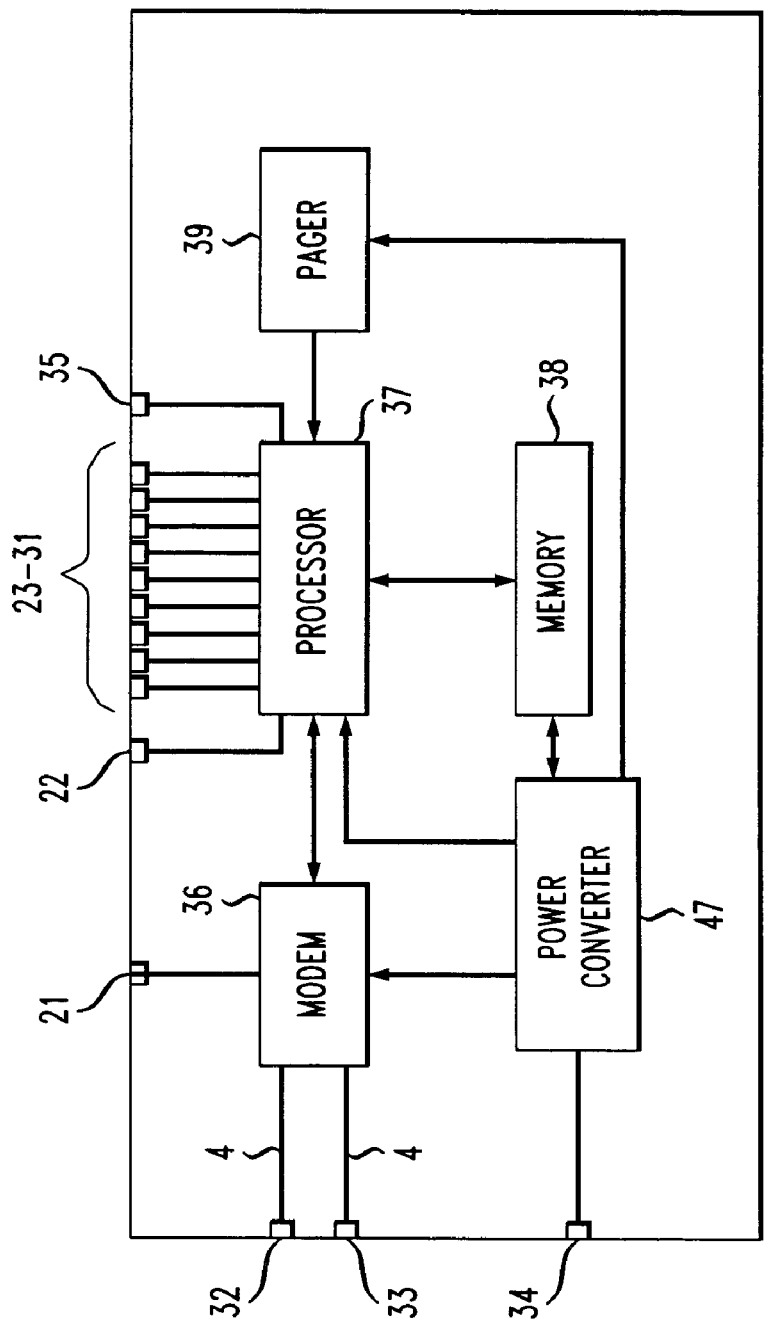
FIG. 3 depicts a block diagram of the Remote Answering Device according to the present invention.

Turning to FIG. 3, shown therein is a block diagram of the Remote Answering Device 1. The telephone line 4 passes to a modem 36 via the RJ-11 jacks 32, 33, which modem 36 is connected to a processor 37, that controls the operation of the Remote Answering Device 1. The processor 37 is also connected to a memory 38, the control keys 23–31, the message indicator 22, the keypad 35, and a power converter 47, which converts the 120 V power to 5 V power, for example. The power converter 47 also provides 5V power to the modem 36, an optional pager 39, and memory 38 and is connected to the electrical outlet 34. The memory 38 stores the local greeting and also stores the access telephone numbers and security codes necessary to access the network based voice mail system 6.

Answering a Call

When a telephone call comes in which is not answered by a human, the Remote Answering Device 1 picks up after a preselected number of rings. The Remote Answering Device 1 will then play a greeting, which is prerecorded and stored locally (in the memory 38) and will then prompt the caller to wait for a beep. The Remote Answering Device 1 then uses the three-way calling service to conference the user's voice mail number (predetermined by the Network Based Voice Mail System and provided to the user by the three-way calling service provider, which is usually the Local Service Provider 4) into the call, by sending a hook flash signal and speed dialing the user's voice mail number, which was previously entered into the memory 38 by the user using the keypad 35. This conference call takes only about three seconds. When a conference call is established, it plays the beep and then records the message, which is also being played live on the speaker 21 in the user's home. The caller can skip the greeting by pressing any button (or a predetermined button such as the "#" key), as with most traditional answering machines.

When the User Picks Up During Recording or Greeting

After answering a call, the Remote Answering Device 1 constantly monitors the impedance of the telephone line 4 to detect if any of the extension phones is being picked up. If an extension is picked up, the Remote Answering Device 1 drops the conference call by sending another hook flash signal and hangs up. A hook flash signal will drop the last entrant to a conference call, so no modification to the switch (not shown) at the local service provider 5 is necessary. The user can then talk normally with the caller.

Message Indicator and Playback of Messages

Since the Remote Answering Device 1 answers all incoming calls, the Remote Answering Device 1 knows how many messages have been left and can indicate this number on the message indicator display 22. The user can press a simple "play" button 23 to play back the messages. The Remote Answering Device 1 will automatically call up the user's voice mail box 12 and start playing the messages. Again, this takes no more than three seconds. Other buttons like "skip" 27, "delete" 25, "fast" 28, "slow" 29 etc. can be added. They act as remote controls for the voice mail box 12.

If users wish to retrieve messages from outside home they can call their home number, wait till the greeting is over or skip it and, when connected with the network mail box 12, enter their PIN code to access their messages. This procedure is, again, no different than with a normal answering machine. The Remote Answering Device 1 monitors this session to know how many messages have been deleted and how many have been left. It may even count how many old and how many new messages are currently present in the voice mail box 12.

If, in a future service, the user deletes messages from access points other than a telephone, e.g., a computer, then the message indicator 22 of the Remote Answering Device 1 might still indicate messages, which, in reality, have already been deleted. One touch of the "play" button 23, however, will synchronize the display.

One possible embodiment for realizing this is sending data over voice, i.e., the Remote Answering Device 1 queries the Network Based Voice Mail System 6 to determine the number of messages to play, which automatically synchronizes the Remote Answering Device 1 with the Network Based Voice Mail System 6, at least with regard to the number of messages to play. The Network Based Voice Mail System 6 then transmits the number of messages remaining while simultaneously transmitting the voice messages (thus, data over voice). While the basic concept of the present invention requires no modifications to the local switch or Network Based Voice Mail System 6, this capability will require a modification to the existing Network Based Voice Mail System 6.

Alternatively, the Network Based Voice Mail System 6 could append the data at the end of the voice messages, which would not require the more complex data over voice technology. As this data would not require more than a couple of bits, it could easily be sent either before or after other messages.

Likewise, if messages are delivered by other ways than calling the user's phone number, then the message indicator 22 of the Remote Answering Device 1 might miss calls. This is for instance the case, when a caller directly calls the user's voice mail box number 12 to leave a message without disturbing the recipient. Again, the display will be synchronized with one touch of the "play" button.

The Remote Answering Device 1 can be set to periodically call in to the voice mail box 12 to synchronize its message indicator, for example four times an hour. Each such call will be less than 5 seconds in total.

Alternatively, the Network Based Voice Mail System 6 can page the Remote Answering Device 1 indicating the presence of a call that entered the mail box without going through the Remote Answering Device 1. This is accomplished by including a pager 39 in the Remote Answering Device 1. Simply paging the Remote Answering Device 1 when a message enters the Network Based Voice Mail System 6 without passing through the Remote Answering Device 1 would ensure that the two mail boxes remain in synchronization with regard to the number of messages in the voice mail box 12.

Multiple Mail Boxes

Certain answering machines offer multiple mail boxes. The greeting usually prompts a user to press 1 to leave a message for person A, to press 2 for person B, etc. The Remote Answering Device can offer the same service. It senses which number was pressed and then calls up that person's voice mail number or a default voice mail box (if no button was pressed) to record the message. The individual members of a household need not even be on the same voice mail system.

Invention Specific Advantages

Besides the well-known advantages of network based voice message systems there are a few more advantages which are specific for the use with a Remote Answering Device.

Multiple Homes

People who have multiple telephones in different locations, for instance, a vacation home or a private office, can use multiple Remote Answering Devices but need only one network based voice mail service. All messages will go to the same place but any of the Remote Answering Devices are able to access and play back all messages. So, a call to home when a user is on vacation will go to the user's voice mail box 12, and a call to the user's vacation home will also go to the same voice mail box 12 if unanswered. This enables the user to listen to all messages without calling the voice mail at home, at the office, at the cellular service, and at the vacation home, for example.

Wireless Voice Mail

Customers with mobile phones need only to subscribe to no answer/busy forward service instead of a full voice mail service. They can then forward unanswered calls to their home voice mail number. Without losing any of the features of a mobile voice mail service (except notification which could be offered by our service as well) they get the additional advantage of being notified of wireless messages when entering the home and being able to play them in an uncomplicated easy way (Oust press the "play" button on the Remote Answering Device).

It is possible to create a mobile version of the Remote Answering Device that one could carry to enable one to access and play back messages to one's home phone or any other telephone.

Higher Reliability

A power outage at home will not erase any messages, because the messages are stored at the Network Based Voice Mail System 6. Alternatively, the messages could be stored in both places to ensure redundancy (or backup) for very important messages. In this case, the Remote Answering Device 1 would then access the Network Based Voice Mail System 6 and indicate that the messages were played to the user, thereby indicating to delete the messages. Or, the user could simply replace a tape in the Remote Answering Device 1, thereby enabling archival of the messages. In this case, the playback would occur in the normal manner, as described above.

Furthermore, the user can advise the local telephone company to forward the calls on no answer/busy directly to the voice mail number. In addition, it is possible for the Network Based Voice Mail System 6 to notify the caller that the call to the home phone did not go through because the line is busy or down. Because the message that is played by the Network Based Voice Mail System 6 is different than the message played by the Remote Answering Device 1, the message could indicate that the call did not go through. To indicate that the line was down would require some reprogramming at the local switch; however, it would enable a caller to attempt to reach the user by another means to let the user know the line is down or his equipment is malfunctioning. This could be an additional service provided by the local service provider.

If a call arrives during a power outage, then the caller is still able to leave a message. To accomplish this, the number of rings set by the local telephone company before forwarding the call must be higher than the number of rings set by the Remote Answering Device.

Record Messages When the Line is Busy

The same no answer/busy forward feature described above can be used for callers to leave messages when the line is busy, so no calls are missed. Using the caller ID information the voice mail system can determine where the call is coming from and play a greeting accordingly, e.g., "the line is currently busy, please leave a message." Even though users don't know immediately that a call came while they were on the phone, they will know a few minutes later, after the Remote Answering Device synchronizes with the voice mail system the next time.

Compatibility with Existing Voice Mail Systems

An important property of the Remote Answering Device is that it works with any existing or future voice mail system. There is no major development work necessary on the network side of the service.

Synchronization of the Message Indicator

The synchronization of the message indicator requires data to be exchanged between the Remote Answering Device and the Network Based Voice Mail Service. It can be done by sending data over voice. This is standard technology but currently not supported by voice mail systems. If it is not supported, then the message indicator might be out of synchronization when message traffic bypasses the Remote Answering Device, e.g., when the voice mail number is called directly to leave a message or retrieve and delete messages.

As described above, it is possible to accomplish this using paging technology, as well.

Erasing Calls which have Been Intercepted

When an extension phone is picked up at home during the recording of a message, the Remote Answering Device drops the connection to the voice mail system and lets the user talk to the caller. A standard voice mail system will not know the difference between a full message and a message which has been intercepted and will therefore keep all intercepted messages. The Remote Answering Device sends a few bits of data to the voice mail system before disconnecting the line to indicate whether the call has been intercepted or not. If the voice mail system is able to read this data it can erase intercepted messages which is what the user expects to happen.

Local and Network Stored Greetings

Normally the Remote Answering Device plays the greeting which is stored locally. It could be network based but then a caller needs to wait for about three seconds before being connected to the network. On the other hand, if a call gets forwarded directly to the voice mail box (e.g., the line is busy), then the network needs to play the greeting. With standard voice mail systems this leads to two greetings being played in sequence for normal calls. If the voice mail system detects where the call is coming from, it can either play its own greeting or not play a greeting at all if the call comes from the Remote Answering Device. This also allows for different greetings for no answer or busy situations.

Alternatively, the Remote Answering Device could disable the greeting by sending the appropriate signal (such as, for example, the particular Dialed Tone Multiple Frequency, DTMF, signal for the # key) over the line. This would skip the greeting and immediately play the beep to indicate to the caller to begin recording the message.

Implementation
The Network Side

As mentioned earlier, the network side of the service requires either no change at all or only minor changes which can be incorporated into the existing software. The only consideration is adding a modem for sending data over voice to each telephone line.

The Remote Answering Device

The Remote Answering Device not only looks like but is also built very much like a traditional answering machine. The basic differences are:

The capability to send and receive data over voice.

The capability to send hook flash and touch tone signals.

The play back buttons act as a remote control for dialing into the voice mail system and sending touch tone commands to it.

The recording and playing of the greeting is local.

The Remote Answering Device should be able to work with all voice mail services offered on the market. The specific touch tone sequences for play, delete, skip, etc. which need to be known in order to make the buttons on the Remote Answering Device work can be stored in a small memory. It is possible for the Remote Answering Device to sense which service it connects to (e.g., by listening for specific tones) or the user can select the specific service he or she is using with a dip switch (similar to selecting a TV product on a universal remote control).

Furthermore, the present invention is applicable to company based voice mail systems, i.e., voice mail systems that operate on a customer premises or on customer premises equipment (CPE). In this case, the remote answering device connects to the telephone outlet as described above, and conferences in the company based voice mail system rather than the network based voice mail system. As dialing within a company based telephone system is usually simpler, this should work slightly faster than the network based version. All the above described procedures and embodiments apply in a similar manner though.

Alternative Implementations
Conference Call Initiated from the Network

The user subscribes to the no answer/busy forward feature of the local telephone company. Unanswered calls are redirected to the voice mail service. When the service receives a call, it will automatically call back the user's home and conference it in to the call. The Remote Answering Device detects that the call is coming from the voice mail system by looking at the caller ID information and answers the call immediately and puts it on the speaker phone.

The main problem with this solution is that when a user intercepts and picks up an extension phone, he or she will be connected to the calling party through the voice mail system and two of its phone lines will be busy for the duration of the call (which can be an hour or more, versus a few minutes at the most for leaving a message). This will make the required hardware on the network side more expensive. Furthermore, it is no longer compatible with standard voice mail systems.

Conference Call Initiated from Home

Alternatively, the Remote Answering Device could sense when a call is not answered and right after it has been forwarded to the voice mail system place a call to the voice mail system itself. However, this solution has the same down sides as the above alternative.

What is claimed is:

1. In a network based voice mail system that has a user voice mail box that is accessible over a telephone network via a predetermined telephone number and an optional predetermined access code, a remote answering device comprising:

a) a modem answering an incoming call upon detecting a predetermined number of rings, dial the user's voice mail box using a three-way calling service and conferencing the incoming call with the user's voice mail box;

b) a memory storing the predetermined telephone number and the optional predetermined access code, and a local greeting that is played to a caller during an incoming call while the network based voice mail system is being accessed;

c) a processor controlling the modem and passing the predetermined telephone number and optional predetermined access code from the memory to the modem; and d) a paging receiver receiving a paging signal that indicates that a message exists in the network based voice mail system that was not received by the remote answering device, and outputting a numerical code to the processor indicating a message count.

2. The device according to claim 1, further comprising:

a speaker coupled to the modem, wherein the modem is to output a voice signal from the incoming call to the speaker.

3. The device according to claim 1, further comprising:

a message number display coupled to the processor displaying a count of the messages in the network based voice mail system, wherein the paging receiver receives a page from the network based voice mail system indicating that a message has been received in the user's voice mail box without passing through the remote answering device, and wherein the paging receiver outputs the message count to the processor which updates the message number display.

4. The device according to claim 1, wherein the processor detects a change in an impedance of the telephone line which indicates that a telephone extension has been picked up, and then outputs a signal to drop the voice mail box from the conference call in response to the change in the detected impedance.

5. The device according to claim 1, further comprising:

a plurality of control buttons coupled to the processor.

6. The device according to claim 5, wherein the plurality of control buttons include at least one selected from the group consisting of play, stop, delete, record, skip, fast, slow, save, and rewind.

7. The device according to claim 1, further comprising:

a telephone built into the device.

8. The device according to claim 1, further comprising:

a number keypad for entering in the predetermined telephone number of the user's voice mail box and for entering in the optional predetermined access codes for accessing the user's voice mail box.

9. The device according to claim 2, wherein the message being recorded by the caller is simultaneously being played over the speaker.

10. The device according to claim 1, further comprising:

a play button, wherein the processor initiates a call to die user's voice mail box upon the play button being pressed and the processor queries the user's voice mail box to determined how many messages remain in the user's voice mail box, and if different than those contained in a count maintained by the processor, the processor synchronizes its count to that of the user's voice mail box.

11. The device according to claim 10, wherein the modem receives data from the user's voice mail box while simultaneously receiving voice signals.

12. The device according to claim 10, wherein the processor periodically calls in to the voice mail box to synchronize its message indicator.

13. The device according to claim 1, wherein the remote answering device further comprises a tape recorder, which records incoming messages simultaneously along with the network based voice mail system.

14. The device according to claim 1, wherein the network based voice mail system indicates to a caller that the call to the user did not go through if the call to the user does not get through to the remote answering device.

15. A method comprising:

receiving a call at an Internet accessible voice mail system;

recording a message at the Internet accessible voice mail system;

receiving a query from a remote answering device via a communications bridge established by the remote answering device;

transmitting a signal indicating a number of messages recorded at the Internet accessible voice mail system via the communications bridge to the remote answering device in response to the query; and simultaneously transmitting the message recorded at the Internet accessible voice mail system via the communications bridge to the remote answering device in response to the query.

16. The method of claim 15, further comprising the steps of:

receiving a request for the message recorded at the Internet accessible voice message system from a user via a World Wide Web site; and transmitting the recorded message to the user in response to the request.

* * * * *